Dec. 1, 1925.  
C. J. P. HOEHN  
FLEXIBLE PIPE JOINT  
Filed April 1, 1924  
1,564,175

INVENTOR.  
Charles J. P. Hoehn  
BY  
Miller Henry Boykin  
ATTORNEYS

Patented Dec. 1, 1925.

1,564,175

UNITED STATES PATENT OFFICE.

CHARLES J. P. HOEHN, OF SAN FRANCISCO, CALIFORNIA, ASSIGNOR TO THE ENTERPRISE FOUNDRY CO., OF SAN FRANCISCO, CALIFORNIA, A CORPORATION OF CALIFORNIA.

FLEXIBLE PIPE JOINT.

Application filed April 1, 1924. Serial No. 703,534.

*To all whom it may concern:*

Be it known that I, CHARLES J. P. HOEHN, a citizen of the United States, and a resident of the city and county of San Francisco, State of California, have invented new and useful Improvements in Flexible Pipe Joints, of which the following is a specification.

The object of my invention is to provide a flexible connection between pipes adapted to carry pressure fluid.

A further object is a flexible pipe connection of the character described having a relatively non-oxidizable surface whereby flexibility is maintained through the life of the joint.

A further object is a joint of the character described wherein lead or other suitable packing is employed as one of the bearing surfaces of a ball and spigot joint and of relatively softer material than the other member of the joint and wherein the said softer material is compressed about the surface of the harder surface of the other member to insure a perfect contact along the relatively movable surfaces.

Another object is a joint of the character described wherein the means employed for compressing the relatively soft metal are positioned so as to require a minimum of labor and cost to accomplish the compressing of the packing material when the joints are first assembled or subsequently repaired.

Other objects will appear from the drawings and specifications which follow.

By referring to the accompanying drawings my invention will be made clear.

Throughout the figures similar numerals refer to identical parts.

Figure 1:
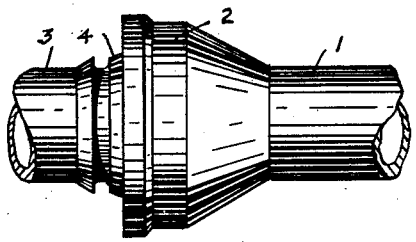
Fig. 1 is a fragmentary side view of a ball and spigot joint of the type to which my invention is particularly applicable
Figure 2:
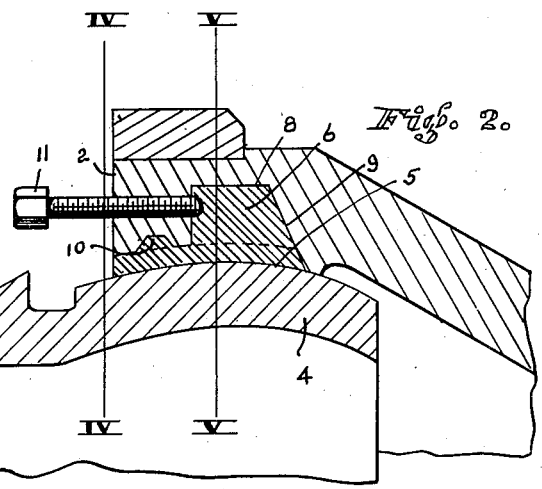
Fig. 2 is an enlarged longitudinal cross section through one side of such a joint with my invention applied thereto, and is taken on the line II—II of Fig. 4.
Figure 3:
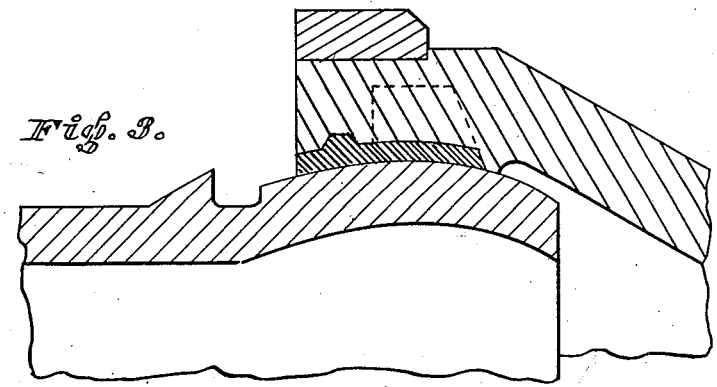
Fig. 3 is similar to Fig. 2 but displaced therefrom and is taken on the line III—III of Fig. 4.
Figure 4:
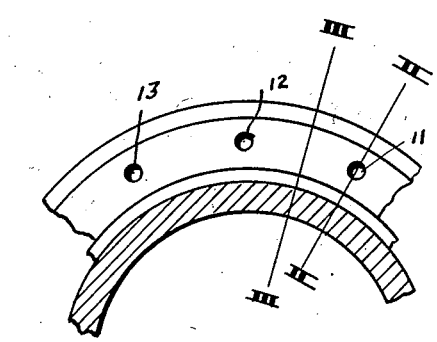
Fig. 4 is a fragmentary cross section on the line IV—IV of Fig. 2.
Figure 5:
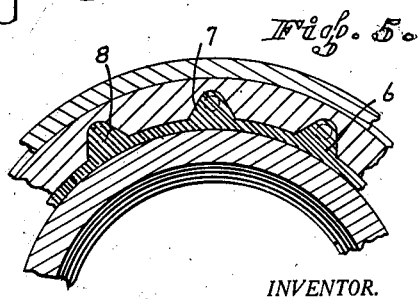
Fig. 5 is taken on the line V—V of Fig. 2.

At 1 is shown a cast iron pipe section having a bell end 2, and at 3 a cast iron pipe section having a spigot end 4. The bell and spigot have co-operating spherical sufaces as at 5. The spigot portion being here shown as of finished cast iron and the bell portion of the said spherical surfaces being of the soft metal as lead or other suitable packing 6. The bell end 2 is cored with a plurality of spaced pockets 7, 8 preferably having sloping surfaces 9 on their inner ends and communicating inwardly towards the ball surface 5.

At 10 is an annular groove to hold the soft metal 6 locked against displacement when the joint moves and at 11, 12, 13, are set screws threaded into the metal 2 and communicating with the pockets as 7, 8.

The parts are assembled by inserting the spigot end 3 within the cast opening of the bell 2 and when properly positioned therein casting the lead or packing 6 into the groove 10 and plurality of pockets 7, 8 and against the finished surface 5 of the spigot. In this way the parts are locked together on a movable spigot joint.

By my invention the soft metal remaining in the pockets 7, 8, is now compressed by the set screws 11, 12, 13, whereby it is squeezed into perfect contact with the ball surface. The soft metal flowing in all directions under the pressure against and compacting against the finished ball surface 5 will now form a perfect spherical joint preventing leakage of fluid from the interior of the pipe.

In large structures of this kind as pipes laid under the water and in mud flats, sandy bottoms and the like, as for city water works and dredging operations, it is difficult to reach the under side of said pipes and it is particularly difficult to manipulate or tighten set screws for compressing the packng when the set screws are arranged in a radial direction.

Moreover radial or approximately radial set screws when they are advanced to force or compress the packing, not infrequently cut into the ball surface 5 of the member 3, injuring the same beyond repair, whereas by my invention having pockets with lateral set screws whose axis of movement is clear of the ball joint, a perfect compression may be exerted over the entire range of set screw movement without damage to the joint and need not be thereafter removed, as in packed joints heretofore, but may be left in place filling the holes and properly backing the soft metal and may if desired, be tightened from time to time to increase the compression of the packing.

I claim:

1. In a ball and socket joint, said socket provided with a space adjacent the ball and having pockets opening therefrom adapted to receive packing material, compression means for said material communicating with each pocket and having an axis of compressive movements at all times clear of the ball joint.

2. In a ball and socket joint, the combination of elements set forth in claim 1 wherein the pockets are spaced regularly about the inner surface of the socket and the compression means are set screws.

3. In a ball and socket joint, the combination of elements set forth in claim 1 wherein the pockets are spaced regularly about the inner surface of the socket and the compression means are set screws and wherein the joint is packed by casting soft metal within the space and pockets and against the ball surface.

4. In a ball and socket joint, the combination of elements set forth in claim 1 wherein the pockets are spaced regularly about the inner surface of the socket and the compression means are set screws and wherein the joint is packed by casting soft metal within the space and pockets and against the ball surface and then compressed by advancing the screws into the pockets.

5. In a ball and socket joint, said socket provided with a space adjacent the ball and having pockets opening therefrom adapted to receive packing material, compression means for said material communicating with each pocket and having an axis of compressive movement for said packing at all times clear of the ball joint, the pockets each having a wall opposite the compressive means formed on a slope making an acute angle with a tangent to the adjacent ball joint.

6. In a ball and socket joint, the combination of elements set forth in claim 5 wherein the pockets are spaced regularly about the inner surface of the socket and the compression means are set screws substantially parallel with a tangent to the adjacent ball surface.

7. In a ball and socket joint, the combination of elements set forth in claim 5 wherein the pockets are spaced regularly about the inner surface of the socket and the compression means are set screws and wherein the joint is packed by casting soft metal within the space and pockets and against the ball surface.

8. In a ball and socket joint, the combination of elements set forth in claim 5 wherein the pockets are spaced regularly about the inner surface of the socket and the compression means are set screws and wherein the joint is packed by casting soft metal within the space and pockets and against the ball surface and then compressed by advancing the screws into the pockets.

CHARLES J. P. HOEHN.